(12) United States Patent
Tao (10) Patent No.: US 11,354,853 B2
(45) Date of Patent: Jun. 7, 2022

(54) SYSTEMS AND METHODS FOR CONSTRUCTING 3D PANAROMA MODEL

(71) Applicant: REALSEE (BEIJING) TECHNOLOGY CO., LTD., Beijing (CN)

(72) Inventor: Ning Tao, Beijing (CN)

(73) Assignee: REALSEE (BEIJING) TECHNOLOGY CO., LTD., Beijing (CN)

( * ) Notice: Subject to any disclaimer, the term of this patent is extended or adjusted under 35 U.S.C. 154(b) by 84 days.

(21) Appl. No.: 16/882,368

(22) Filed: May 22, 2020

(65) Prior Publication Data
US 2021/0248814 A1 Aug. 12, 2021

(30) Foreign Application Priority Data
Feb. 7, 2020 (CN) .......................... 202010082490.X (51) Int. Cl.
*G06T 17/00* (2006.01)
*G06F 17/16* (2006.01)
*G06T 7/521* (2017.01)

(52) U.S. Cl.
CPC .............. *G06T 17/00* (2013.01); *G06F 17/16* (2013.01); *G06T 7/521* (2017.01); *G06T 2207/10024* (2013.01); *G06T 2207/10028* (2013.01)

(58) Field of Classification Search
None
See application file for complete search history.

(56) References Cited

U.S. PATENT DOCUMENTS

| | | | |
|---|---|---|---|
| 2019/0011529 A1* | 1/2019 | Choi | H04N 13/271 |
| 2019/0122377 A1* | 4/2019 | Chen | G06T 7/60 |
| 2020/0058164 A1* | 2/2020 | Sarup | G06T 15/00 |

(Continued)

FOREIGN PATENT DOCUMENTS

EP 3690818 A1 * 8/2020 ........... G06T 11/206

OTHER PUBLICATIONS

Cordova-Esparza et al. "A multiple camera calibration and point cloud fusion tool for Kinect V2", Science of Computer Programming 143 (2017) 1-8 (Year: 2017).*

(Continued)

*Primary Examiner* — Saptarshi Mazumder
(74) *Attorney, Agent, or Firm* — Bayes PLLC (57) ABSTRACT

Systems and methods for constructing a three-dimensional panorama model of an object are disclosed. An exemplary system includes a storage device configured to receive a plurality of point clouds each acquired at a different view angle. Each point cloud includes three-dimensional positions of a plurality of target points on a surface of the object. The system further includes at least one processor configured to determine elevation and normal at each target point in each point cloud and convert the elevation of each target point to color information. The at least one processor is further configured to register every two adjacent point clouds among the plurality of point clouds based on the three-dimensional positions, the normal, and the color information of the respective target points of the two adjacent point clouds. The at least one processor is also configured to render the three-dimensional panorama model based on the registered point clouds.

20 Claims, 5 Drawing Sheets

(56) References Cited

U.S. PATENT DOCUMENTS

2020/0111251 A1* 4/2020 Shi ..................... G06K 9/6284
2021/0049779 A1* 2/2021 Harviainen ............... G06T 7/38

OTHER PUBLICATIONS

Pepe et al. "3D Point Cloud Model Color Adjustment by Combining Terrestrial Laser Scanner and Close Range Photogrammetry Datasets" International Journal of Computer and Information Engineering vol. 10, No. 11, 2016, (Year: 2016).*

* cited by examiner

SYSTEMS AND METHODS FOR CONSTRUCTING 3D PANAROMA MODEL

RELATED APPLICATIONS

This application hereby claims the benefits of priority to Chinese Application No. 202010082490.X filed on Feb. 7, 2020, which is hereby incorporated by reference in its entirety.

TECHNICAL FIELD

The present disclosure relates to systems and methods for constructing a panorama model based on point clouds acquired from different view angles, and more particularly, to systems and methods for constructing a three-dimensional (3D) panorama model by registering point clouds acquired from different view angles based on color information derived from the point clouds.

BACKGROUND

In the real estate market, when a person wants to buy or rent a property, he typically would ask to tour the property first in order to visually experience the layout and furnishing. House tours are often conducted in person, e.g., by the property owner or a real estate agent. While property tours are informative to the potential buyer/renter, it is also time consuming and inefficient. Recently, Virtual Reality (VR) technology has been applied to conduct these tours virtually. Videos, images, and point cloud data of the property are taken in advance. A 3D panorama model is rendered based on the point cloud data and/or the images. As a result, a visitor can remotely view the property without having to do it in person.

3D panorama view reconstructs a scene using VR technology based on panoramic images. A panorama merges multiple images taken by camera in 360-degree view angles, thus reconstructing an all-around interactive view of the scene. Similarly, a 3D panorama model merges point clouds acquired at various times and various view angles into a panoramic model. Before the panoramic rendering, the multiple point clouds have to be registered (known as "point cloud registration" or "scan matching"), a process of finding a spatial transformation that aligns two point clouds. The purpose of the transformation is to merge the various data sets into a worldly consistent model, so that they can be seamlessly merged together to render the panorama model.

A point cloud is a collection of points on the surface of an object scanned by the acquisition device. The point cloud contains information of the distribution of these points, such as their 3D coordinates, and features of the object surface. Point clouds acquired by certain point cloud acquisition devices may further include depth information and color information. Point cloud registration can benefit from using the redundancy of information available for each point. For example, the registration may see improved accuracy if the coordinates, elevation, and color information of the points are all used.

However, most of the acquisition devices, such as a Light Detection and Ranging (LiDAR) device, are mobile devices that move around during the acquisition. As a result, the acquired depth information and color information are not well aligned, thus cannot be used to synthesis accurate color data. Using the existing color information in the point clouds to aid the registration may adversely affect its accuracy.

Embodiments of the disclosure improve the existing point cloud registration systems and methods by deriving various information, such as color information, from the point clouds instead of using the acquired color information.

SUMMARY

In one aspect, a system for constructing a three-dimensional panorama model of an object is disclosed. An exemplary system includes a storage device configured to receive a plurality of point clouds each acquired at a different view angle. Each point cloud includes three-dimensional positions of a plurality of target points on a surface of the object. The system further includes at least one processor configured to determine elevation and normal at each target point in each point cloud and convert the elevation of each target point to color information. The at least one processor is further configured to register every two adjacent point clouds among the plurality of point clouds based on the three-dimensional positions, the normal, and the color information of the respective target points of the two adjacent point clouds. The at least one processor is also configured to render the three-dimensional panorama model based on the registered point clouds.

In another aspect, a computer-implemented method for constructing a three-dimensional panorama model of an object is disclosed. An exemplary method includes receiving a plurality of point clouds each acquired at a different view angle. Each point cloud includes three-dimensional positions of a plurality of target points on a surface of the object. The method further includes determining, by at least one processor, elevation and normal at each target point in each point cloud, and converting the elevation of each target point to color information. The method also includes registering, by the at least one processor, every two adjacent point clouds among the plurality of point clouds based on the three-dimensional positions, the normal, and the color information of the respective target points of the two adjacent point clouds. The method additionally includes rendering, by the at least one processor, the three-dimensional panorama model based on the registered point clouds.

In yet another aspect, a non-transitory computer-readable medium having stored thereon computer instructions is disclosed. The computer instructions, when executed by at least one processor, perform a method for constructing a three-dimensional panorama model of an object is disclosed. The exemplary method includes receiving a plurality of point clouds each acquired at a different view angle. Each point cloud includes three-dimensional positions of a plurality of target points on a surface of the object. The method further includes determining elevation and normal at each target point in each point cloud, and converting the elevation of each target point to color information. The method also includes registering every two adjacent point clouds among the plurality of point clouds based on the three-dimensional positions, the normal, and the color information of the respective target points of the two adjacent point clouds. The method additionally includes rendering the three-dimensional panorama model based on the registered point clouds.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Figure 1:
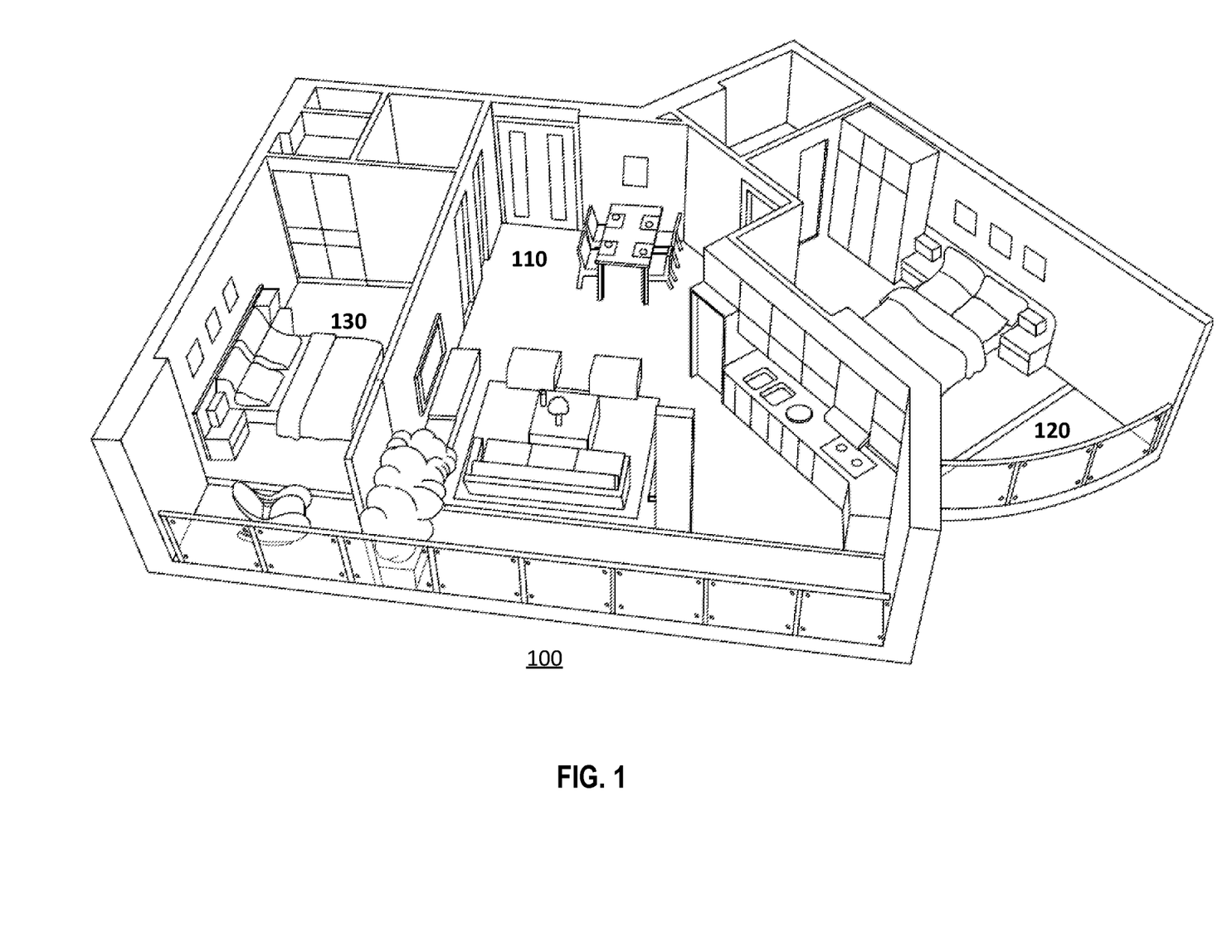
FIG. 1 illustrates a schematic diagram of an exemplary three-dimensional model of a real state property, according to embodiments of the disclosure.

FIG. 1 illustrates a schematic diagram of an exemplary three-dimensional model 100 of a real estate property, according to embodiments of the disclosure. In some embodiments, three-dimensional model 100 may be a panorama model of a property, such as a house, an apartment, a townhouse, a garage, a warehouse, an office building, a hotel, and a store, etc. As shown in FIG. 1, three-dimensional model 100 virtually recreates the real-world property including its layout (e.g., the framing structures that divide the property into several rooms such as walls and counters), finishing (e.g., kitchen/bathroom cabinets, bathtub, island, etc.), fixtures installed (e.g., appliances, window treatments, chandeliers, etc.), and furniture and decorations (e.g., beds, desks, tables and chairs, sofas, TV stands, bookshelves, wall paintings, mirrors, plants, etc.)

In some embodiments, the property may include multiple rooms or functional spaces separated by interior walls. Each room or space may be an object. For example, the object may be a living room, bedroom, dining room, kitchen, bathroom, etc. of the property. Three-dimensional model 100 may accordingly include several sub-models corresponding to the different rooms or spaces. For example, three-dimensional model 100 may include a sub-model 110 for a great room that has combined functions of a living room and a kitchen. As another example, three-dimensional model 100 may further include sub-models 120 and 130 for the two bedrooms.

Figure 2:
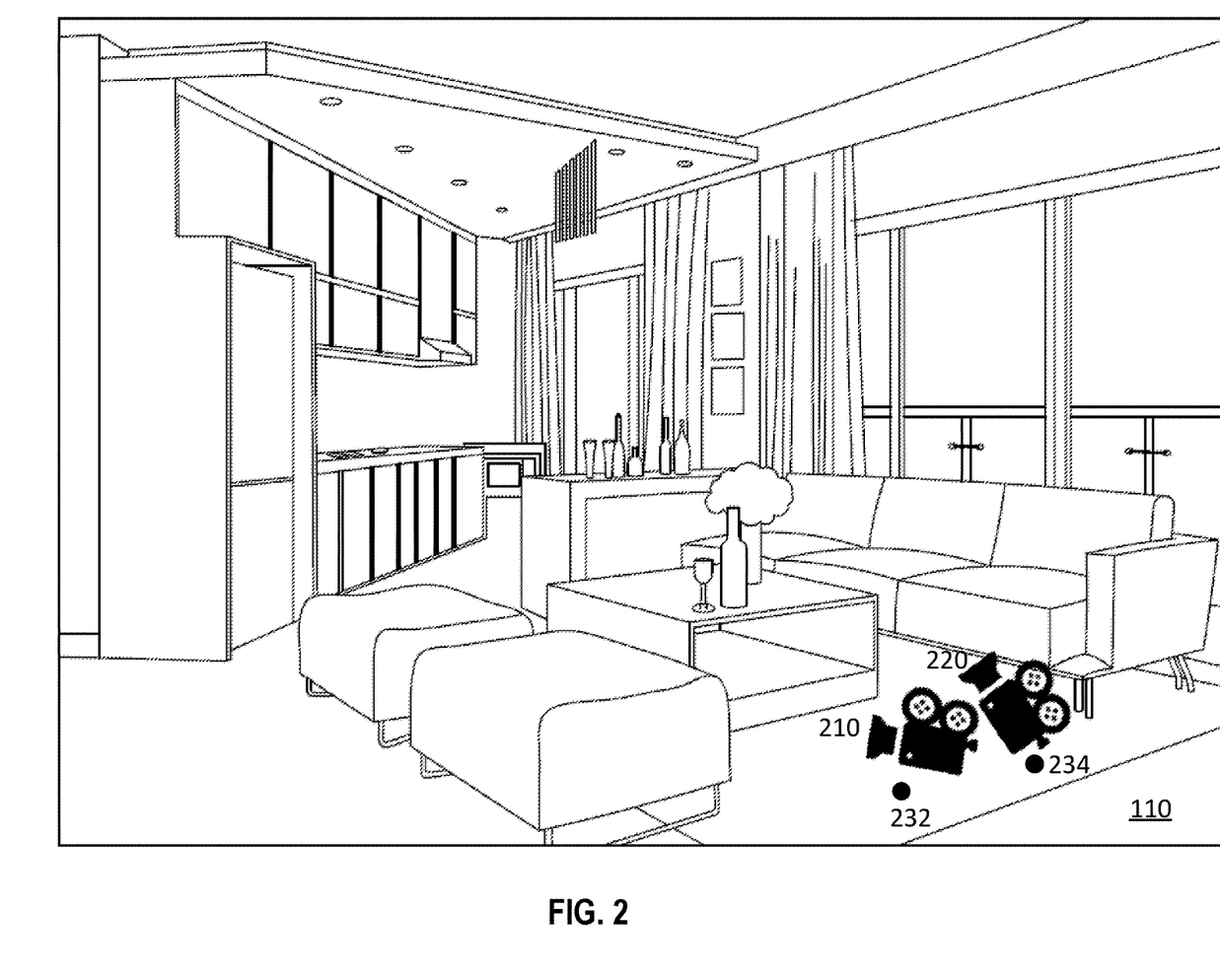
FIG. 2 illustrates an exemplary process of acquiring multiple point cloud at different view angles, according to embodiments of the disclosure.

Three-dimensional model 100 and each of its sub-model may be a three-dimensional panorama model rendered from multiple point clouds acquired of the object. The multiple point clouds may be acquired at different view angles. The point clouds are then post-processed and merged to render the three-dimensional panorama model. For example, FIG. 2 illustrates an exemplary process of acquiring multiple point cloud at different view angles, according to embodiments of the disclosure.

Consistent with the present disclosure, a point cloud is a set of data points in space (referred to as "target points" in this disclosure), which measures the external surface of an object. Point cloud is typically represented by a set of vectors in a three-dimensional coordinate system. In some embodiments, the point cloud may include the three-dimensional coordinates of each target point therein. In some embodiments, depending on the acquisition device used to acquire the point cloud, the point cloud may additionally include one or more of color information (e.g., RGB color information), gray-scale information, depth information, and segmentation result, etc.

Point clouds are generally acquired by 3D scanners, which survey the external surface surrounding the object. FIG. 2 shows 3D scanners 210 and 220 used for acquiring the point clouds of the object (e.g., the great room of a property). Consistent with the present disclosure, 3D scanner 210 and 220 may be selected from RGB-D devices, 2D/3D LiDARs, stereo cameras, time-of-flight (ToF) cameras, etc. Each of these 3D scanners may acquire depth information as well as color information. In some embodiments, 3D scanner 210 and 220 may be selected as different types of 3D scanners. In some embodiments, 3D scanner 210 and 220 may be the same type of scanners.

In some embodiments, point clouds of the object may be acquired at different view angles. For example, as shown in FIG. 2, point clouds of the object of the great room may be acquired by 3D scanner 210 from view angle 232 and by 3D scanner 220 from view angle 234. 3D scanners 210 and 320 may be set up separately to scan the great room at view angles 232 and 234 at different times or simultaneously. In some embodiments, 3D scanner 210 and 3D scanner 220 may be one scanner device, and the point clouds are acquired by rotating the scanner to view angles 232 and 234.

Although only 3D scanners and two view angles are shown in FIG. 2, it is contemplated that more scanners/view angles may be used for capturing the point clouds. The view angles may be selected in a wide range up to 360-degree in the horizontal plane. In some embodiments, the acquisitions are performed at view angles separated at a fixed interval, e.g., one-degree. In some embodiments, the view angles are irregularly selected from the range. For example, more view angles may be selected in a certain sub-range where the object has more variations on the external surface (i.e., vanity in a bathroom). Scans at less view angles may be performed where the object has less surface variations (e.g., a wall in a bedroom). Point clouds acquired at two adjacent view angles may be referred to "adjacent point clouds" consistent with this disclosure.

In some embodiments, at each view angle, the 3D scanner may acquire depth image, and the point clouds are determined based on the respective depth images acquired at the respective different view angles. A depth image is an image or image channel that includes depth information between the view point (where the acquisition device is located) and the surface of the object. The depth image is similar to a grayscale image, where each pixel value represents the distance (L) between the acquisition device and the target point on the object surface. Each pixel value of the depth image occupies a "short" length in storage, which equals to two bytes or 16 bits. For example, the unit length for distance L may be 1/5000 meters (0.2 millimeters). In that case, one meter in distance can encompass 13 pixels and a 16-bit storage can store 65535 pixel values. It is contemplated that the unit can be selected to be a different length, as long it is sufficient to differentiate target points in the depth image as well as not introducing burdensome computational complexity. The goal is to achieve a balance between the visual effect and the computational cost.

In some embodiments, 3D scanners 210 and 220 may be associated with a set of extrinsic parameters describing the different scanner poses used for the acquisitions relative to a world coordinate system. In some embodiments, the extrinsic parameters may be recorded in a matrix (referred to an "extrinsic parameter matrix"). In some embodiments, the extrinsic parameters nay include rotation and translation.

For example, 3D scanner 210 may be set up to scan at an elevation angle, thus causing a rotation in the scanner pose from the world coordinate system. Alternatively or additionally, 3D scanner 210 may be positioned at a location shifted from the origin of the world coordinate system, thus causing a translation. The extrinsic parameters may be used to calibrate the multiple point clouds before they can be registered.

Although the 3D scanners are all capable of acquiring color information, such acquired color information is typically not well aligned with the elevation in the point clouds. The disclosed systems and methods are designed to derive color information from the elevation. The derived color information may be used to replace the acquired color information before point cloud registration. The registration of every two adjacent point clouds may be then performed using the elevations, normals, and the derived color information, to determine the transform matrix between the two adjacent point clouds. After every two adjacent point clouds are registered, the point clouds can be transformed in a world coordinate system using the respective transform matrices. The transformed point clouds may be "merged" together to form a collective point cloud in the world coordinate system. To that end, the discrete point clouds acquired at the various view angles are aggregated into a world point cloud, which may be used to render the three-dimensional panorama model, e.g., sub-model 110 of the great room as shown in FIG. 2.

Although the exemplary three-dimensional models shown in FIG. 1 and FIG. 2 illustrate only indoor space and structures, it is contemplated that the model could also include outdoor space and structures, such as the deck, the front/back yard, the garage, as well as the neighboring environment. A person of ordinary skill can adapt the disclosed systems and methods without undue experimentation for outdoor showings.

Figure 3:
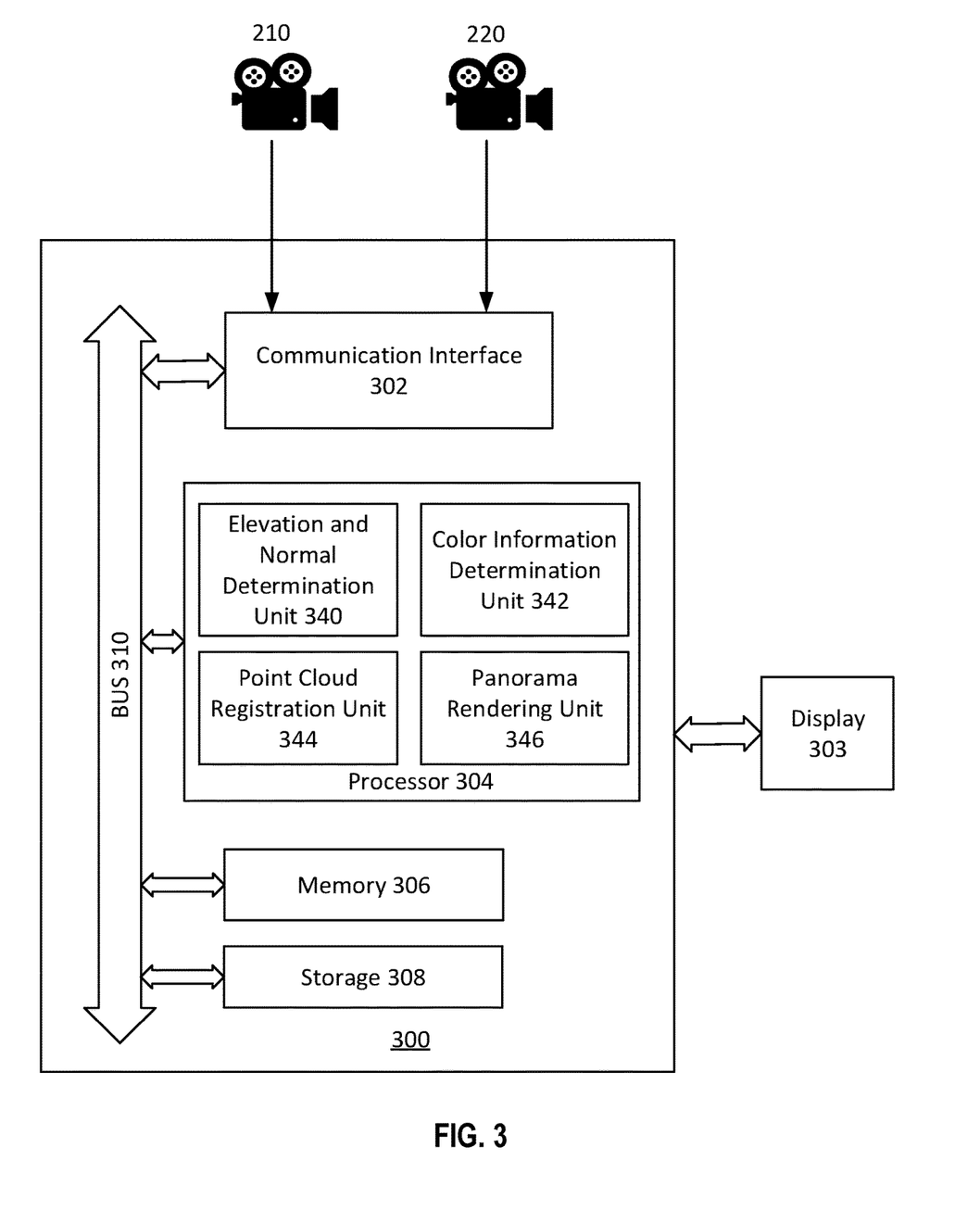
FIG. 3 is a block diagram of an exemplary system for constructing a three-dimensional panorama model, according to embodiments of the disclosure.

FIG. 3 is a block diagram of an exemplary system 300 for constructing a three-dimensional panorama model, according to embodiments of the disclosure. In some embodiments, system 300 may be implemented by a physical server or a service in the cloud. In some other embodiments, system 300 may be implemented by a computer or a consumer electronic device such as a mobile phone, a pad, or a wearable device. As shown in FIG. 3, system 300 may include a communication interface 302, a processor 304, a memory 306, a storage 308, and a bus 310. In some embodiments, system 300 may have different modules in a single device, such as an integrated circuit (IC) chip (implemented as an application-specific integrated circuit (ASIC) or a field-programmable gate array (FPGA)), or separate devices with dedicated functions. Components of system 300 may be in an integrated device, or distributed at different locations but communicate with each other through a network (not shown). The various components of system 300 may be connected to and communicate with each other through bus 310.

Communication interface 302 may send data to and receive point cloud data from components such as 3D scanners 210 and 220 via direct communication links, a Wireless Local Area Network (WLAN), a Wide Area Network (WAN), wireless communication networks using radio waves, a cellular network, and/or a local wireless network (e.g., Bluetooth™ or WiFi), or other communication methods. In some embodiments, communication interface 302 can be an integrated services digital network (ISDN) card, cable modem, satellite modem, or a modem to provide a data communication connection. As another example, communication interface 302 can be a local area network (LAN) card to provide a data communication connection to a compatible LAN. Wireless links can also be implemented by communication interface 302. In such an implementation, communication interface 302 can send and receive electrical, electromagnetic or optical signals that carry digital data streams representing various types of information via a network.

Consistent with some embodiments, communication interface 302 may receive point clouds acquired by one or multiple acquisition devices at varying view angles. In some embodiments, communication interface 302 may further receive extrinsic parameters characterizing the different scanner poses for acquiring the point clouds. In some further embodiments, communication interface 302 may also receive images captured of the object. Communication interface 302 may provide the received information or data to memory 306 and/or storage 308 for storage or to processor 304 for processing.

Processor 304 may include any appropriate type of general-purpose or special-purpose microprocessor, digital signal processor, or microcontroller. Processor 304 may be configured as a separate processor module dedicated to constructing 3D panorama models in order to provide a VR house tour. Alternatively, processor 304 may be configured as a shared processor module for performing other functions related to or unrelated to panorama model construction. For example, VR house tour is just one application installed on a versatile device.

As shown in FIG. 3, processor 304 may include multiple modules, such as an elevation and normal determination unit 340, a color information determination unit 342, a point cloud registration unit 344, and a panorama rendering unit 346, and the like. These modules (and any corresponding sub-modules or sub-units) can be hardware units (e.g., portions of an integrated circuit) of processor 304 designed for use with other components or to execute part of a program. The program may be stored on a computer-readable medium (e.g., memory 306 and/or storage 308), and when executed by processor 304, it may perform one or more functions. Although FIG. 3 shows units 340-346 all within one processor 304, it is contemplated that these units may be distributed among multiple processors located near or remotely with each other.

Memory 306 and storage 308 may include any appropriate type of mass storage provided to store any type of information that processor 304 may need to operate. Memory 306 and storage 308 may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. Memory 306 and/or storage 308 may be configured to store one or more computer programs that may be executed by processor 304 to perform point cloud registration and panorama model construction disclosed herein. For example, memory 306 and/or storage 308 may be configured to store program(s) that may be executed by processor 304 to register the multiple point clouds acquired at varying view angles based color information and other information derived from the point clouds, and then render the 3D panorama view using the registered point clouds that are merged into a world point cloud.

Memory 306 and/or storage 308 may be further configured to store information and data used by processor 304. For instance, memory 306 and/or storage 308 may be configured to store various the point clouds, the view angles at which they are acquired, and extrinsic parameters of acquisitions device that acquire them. Memory 306 and/or storage 308 may also be configured to store intermediate data generated by processor 304, such as elevation, normal, and color information derived from the point clouds, the transform matrices obtained by registering every two adjacent point clouds, and the points clouds that are transformed into a world coordinate system. The various types of data may be stored permanently, removed periodically, or disregarded immediately after each point cloud is processed.

In some embodiments, system 300 may optionally include a display 303. In some embodiments, display 303 may be external to system 300 but be connected with system 300. Display 303 may display the three-dimensional panorama models to the users. In some embodiments, display 303 may further function as a user interface to receive user input. Display 303 may include a Liquid Crystal Display (LCD), a Light Emitting Diode Display (LED), a plasma display, or any other type of display, and provide a Graphical User Interface (GUI) presented on the display for user input and data display. The display may include a number of different types of materials, such as plastic or glass, and may be touch-sensitive to receive commands from the user. For example, the display may include a touch-sensitive material that is substantially rigid, such as Gorilla Glass™, or substantially pliable, such as Willow Glass™.

Figure 4:
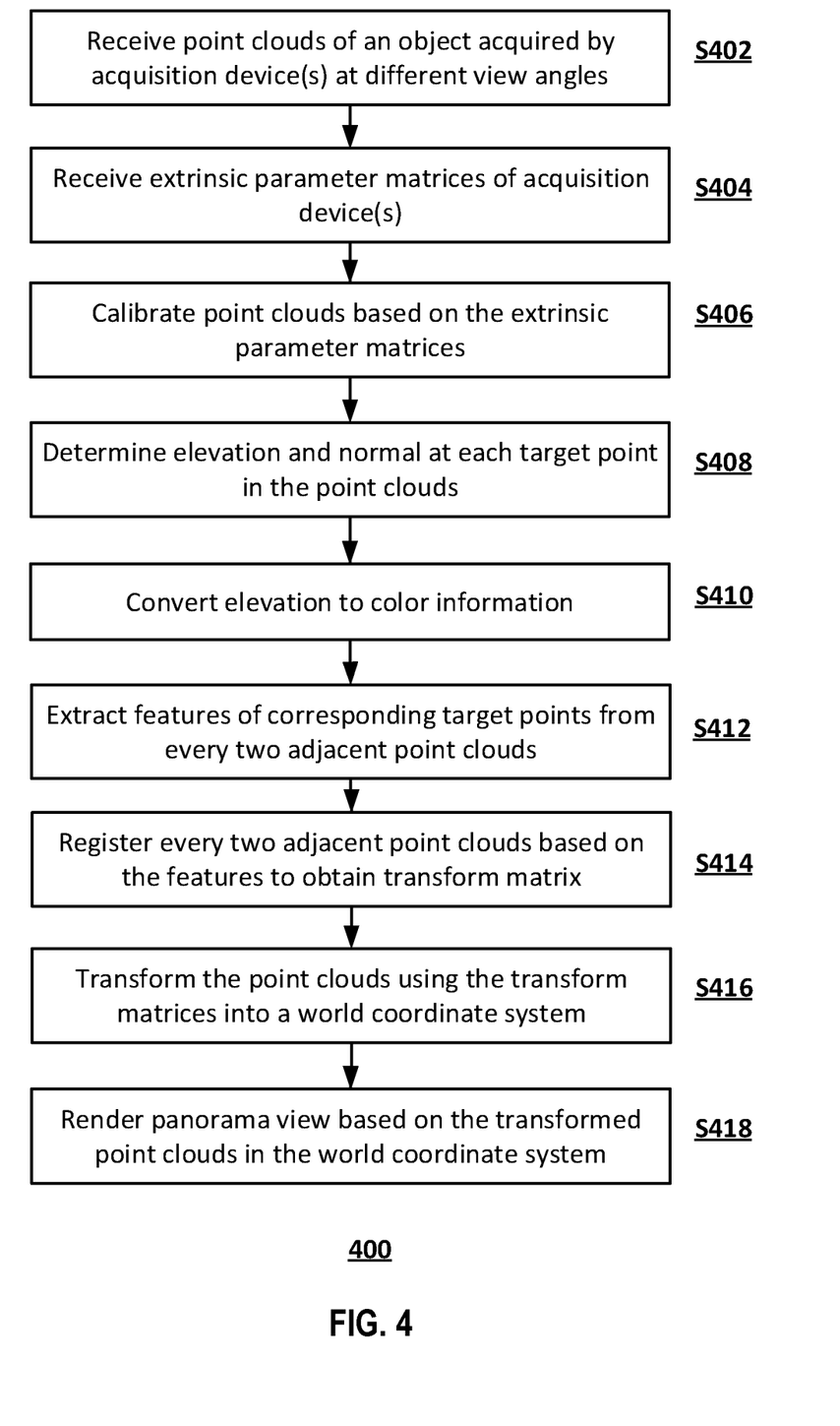
FIG. 4 is a flowchart of an exemplary method for constructing a three-dimensional panorama model, according to embodiments of the disclosure.

The modules of processor 304 may be configured to execute program(s) stored in memory 306/storage 308 to perform a method for constructing a 3D panorama model based on multiple point clouds acquired at varying view angles in order to provide a VR tour to a user. For example, FIG. 4 is a flowchart of an exemplary method 400 for constructing a three-dimensional panorama model, according to embodiments of the disclosure. Method 400 may include steps S402-S428 as described below. It is to be appreciated that some of the steps may be optional to perform the disclosure provided herein. Further, some of the steps may be performed simultaneously, or in a different order than shown in FIG. 4. For description purpose, method 400 will be described as to construct a 3D panorama model 110 of great room (as shown in FIG. 2). Method 400, however, can be implemented for constructing 3D panorama models of other objects, including other functional spaces of a property, or an object that is entirely non-related to a property, such as a person, a vehicle, a architecture, a natural landscape, etc.

In some embodiments, method 400 may be triggered when system 300 receives an instruction to display a 3D panorama model to a user. In some embodiments, system 300 may automatically initiate method 400 when acquisitions of point clouds of an object are received.

In step S402, communication interface 302 may receive point clouds acquired by acquisition devices, such as 3D scanners 210 and 220. In some embodiments, the object being scanned by the acquisition devices is part of a property, such as a house, an apartment, a townhouse, a garage, a warehouse, an office building, a hotel, and a store, etc. As described in connection with FIG. 2, the point clouds are acquired from varying view angles. Each point cloud includes a large amount of target points containing information of the external surface of the object, such as the 3D coordinates and acquired color information. In some embodiments, the 3D scanners may acquire depth images at the varying view angles and the respective point clouds are determined from the depth images.

In step S404, communication interface 302 may further receive extrinsic parameter matrices of the acquisition devices. In some embodiments, each extrinsic parameter matrix may include extrinsic parameters recording pose information of the acquisition device that is used to acquire each point cloud. In some embodiments, the extrinsic parameters may include rotation and translation of the acquisition de ice relative to the world coordinate system.

In step S406, the point clouds may be calibrated based on the extrinsic parameter matrices. In some embodiments, each point cloud is transformed from the acquisition coordinate to the world coordinate system using the extrinsic parameter matrix that characterizes the pose of the acquisition device acquiring the corresponding point cloud. The calibration adjusts the poses of the multiple point clouds so that they can be later registered in the world coordinate system.

In step S408, elevation and normal determination unit 340 may be configured to determine the elevation of each target point in the point clouds. In some embodiments, the elevation can be derived from the 3D coordinates of the target point captured by the acquisition devices. The elevation may be dependent on the world coordinate system used. For example, the horizontal plane where the object is at may be defined as the XOY plane of the world coordinate system. Z-axis is the direction perpendicular with the XOY plane and pointing upwards. Accordingly, in such a world coordinate system, target points at the same height of the object has an elevation of 0, and target points above the plane of the object (i.e., the XOY plane) has an elevation greater than 0. The greater the elevation is, when the target point is farther above the object.

As another example, the horizontal plane where the acquisition device is located at may be defined as the XOY plane of the world coordinate system. Similarly, Z-axis is the direction perpendicular with the XOY plane and pointing upwards. Accordingly, in this world coordinate system, target points at the same height of the acquisition device has an elevation of 0, and target points above the plane of the acquisition device (i.e., the XOY plane) has an elevation greater than 0. The farther above the acquisition device the target point is, the greater the elevation is. The target points below the plane of the acquisition device (i.e., the XOY plane) has a negative elevation. The farther below the acquisition device the target point is, the smaller the elevation is. In a more specific example, assuming an acquisition device is set up at 1.4 meters above the floor, the object (such as the living room, bedroom, dining room, kitchen, or bathroom) is 3.9 meters high. The elevation of the target points would be within the range of [−1.4, 2.5] meters. In another specific example, the object may be 9 feet high and acquisition device is set up at 3 feet above the floor. Therefore, the elevation of the target points would be within the range of [−3, 6] feet.

It is contemplated that definition of the world coordinate system is not limited to the examples disclosed above. Other methods of defining the world coordinate system may be used. Elevation of each target point will be determined according to its height relative to the XOY plane of the coordinate system.

In some embodiments, elevation and normal determination unit 340 may further determine the normal of each target point. Because the target point is located on the external surface of the object, surface normal of the object becomes the normal of the target point ("point normal"). In some embodiments, elevation and normal determination unit 340 may first estimate the geometric surface around the target point and determine the point normal from that geometric surface. In some alternative embodiments, elevation and normal determination unit 340 may use low-order polynomial fitting or local surface fitting to calculate the point normal. In some other embodiments, elevation and normal determination unit 340 may determine a plane defined by points in the point cloud that are within a radius r of the target point, and then determine the normal vector (nx, ny, nz) based on the plane. In some embodiments, r can be a predetermined positive constant, e.g., r=1/1000 meters (i.e., 1 millimeter).

In step S410, color information determination unit 342 is configured to convert the elevation to color information for each target point. In some embodiments, color information determination unit 342 map the elevation to a value in a predetermined range, e.g., [0, 1], and use that mapped value to determine a color element in a certain color model, e.g., a hue-saturation-lightness (HSL) color model. In some embodiments, color information determination unit 342 may first determine a first color element in a first color model (e.g., HSL) using the elevation, and then convert the first color element to a second color element in a second color model (e.g., RGB).

Figure 5:
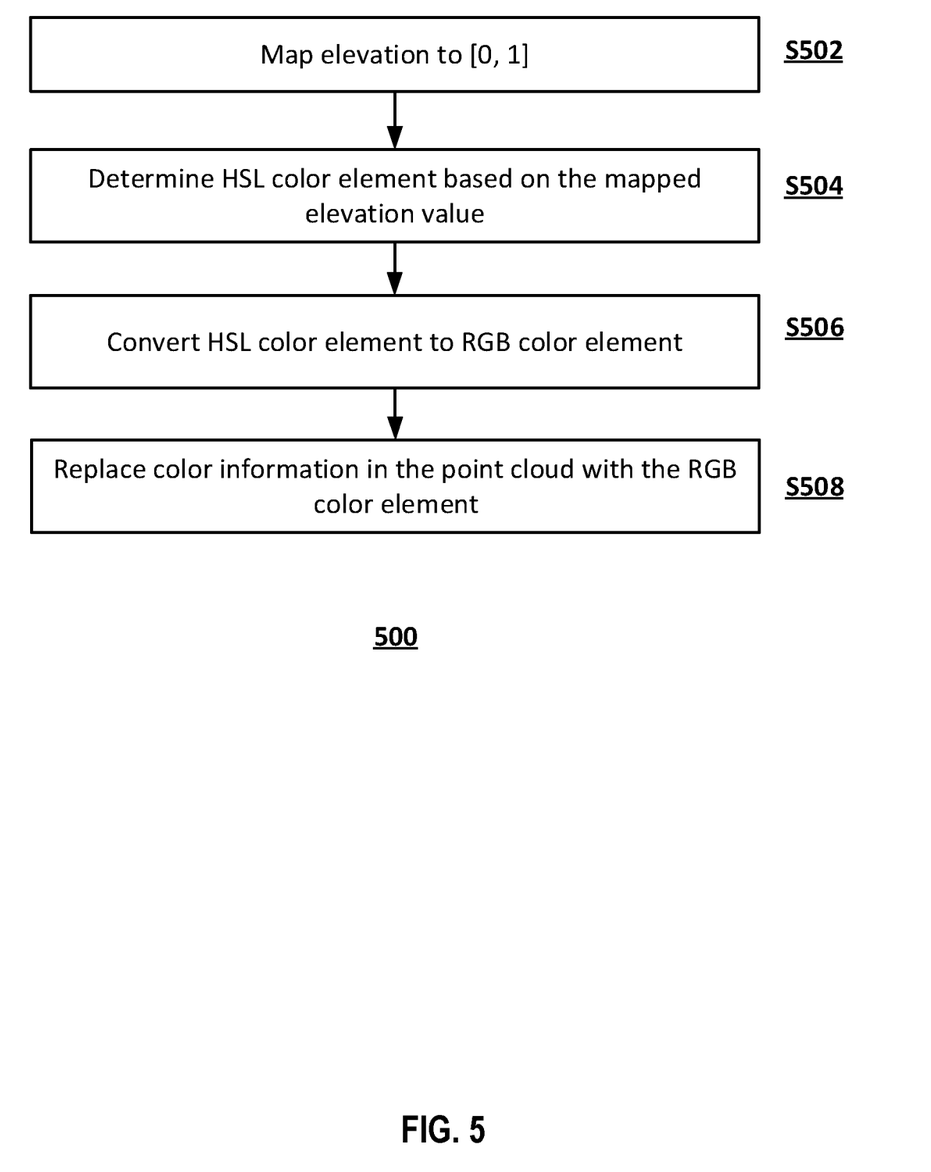
FIG. 5 is a flowchart of an exemplary method for converting elevation to color information, according to embodiments of the disclosure.

In some embodiments, FIG. 5 is a flowchart of an exemplary method 500 for converting the elevation to color information, according to embodiments of the disclosure. Method 500 may be implemented by color information determination unit 342 to perform step S410 of method 400. Method 500 may include steps S502-S508 as described below. It is to be appreciated that some of the steps may be optional to perform the disclosure provided herein. Further, some of the steps may be performed simultaneously, or in a different order than shown in FIG. 5.

In step S502, color information determination unit 342 may map the elevation of each target point in each point cloud to a predetermined range, e.g., [0, 1] according to the predetermined mapping mechanism. For example, the mapping may be a linear mapping or non-linear mapping (e.g., exponential mapping, high-order polynomial mapping, etc.) In some embodiments, the mapping may be performed according to a look-up table, e.g., stored in memory 306.

Using one of the examples above where the world coordinate system is defined using the plane of the acquisition device as the XOY plane, assuming the acquisition device is 1.4 meters above the floor, and the object is 3.9 meters in height above the floor, the elevation of the target points fall within the [−1.4, 2.5] meters range. In one example, the [−1.4, 2.5] range can be linearly mapped to the [0, 1] range, with the lower limit −1.4 mapped to 0, and upper limit 2.5 mapped to 1. In other words, the elevation is normalized to the [0.1] range. More specifically, the elevation values within range [−1.4, 2.5] may be sampled at a predetermined interval, e.g., every 1/1000, and the samples are then converted to values within the range [0, 1].

In step S504, color information determination unit 342 may determine an HSL color element based on the mapped elevation value. HSL is a standard color model widely used in the field. It manipulates three color channels (i.e., hue, saturation, and lightness) to create different colors. The color model covers all human-perceivable colors. HSL color model can be more straightforward than other popular color models, e.g., RGB model, that are based on the Cartesian coordinate. HSL color model uses a cylindrical coordinate with its central vertical axis represents lightness, i.e., black on one end and white on the other end with grayscale values in between. The angular dimension represents hue and radial dimension represents the saturation. For a pixel, HSL color model assigns an intensity value within the 0~255 range to each color channel, thus providing 16777216 different mixtures of colors.

In the HSL color model, hue is an attribute of a visual sensation according to which an area appears to be similar to one of the perceived colors: red, yellow, green, and blue, or to a combination of two of them. Hue typically takes value between 0 to 360 degrees in a radial slice, each angle representing a color. Saturation represents the colorfulness of a stimulus relative to its own brightness, and typically takes values within [0, 1]. It describes the change of saturation from 0% to 100% under the same hue and lightness. A color with a higher saturation is brighter and purer. Lightness represents the brightness relative to the brightness of a similarly illuminated white, and also typically takes value within [0, 1]. A color with a smaller lightness is darker and closer to black, while a color with a larger lightness is the opposite (lighter and closer to white).

For example, color information determination unit 342 may designate the mapped value as a hue value (H) of the HSL color element. Color information determination unit 342 may further designate a first predetermined value as a saturation value (S) and a second predetermined value as a lightness value (L) of the HSL color element. In some embodiments, the first predetermined value can be 1 and the second predetermined value can be 0.5, which provide improved visual effect to human eyes. However, it is contemplated that other values may be designated to the saturation and lightness of the HSL color element. By designating predetermined constant values to the saturation and lightness, computational cost can be reduced and the conversion can be simplified while maintaining a reasonably satisfactory visual effect.

In step S506, color information determination unit 342 may further convert the HSL color element to a red-green-blue (RGB) color element. The RGB color model is an additive color model in which red, green, and blue light are added together in various ways to reproduce a broad array of colors. RGB color model is widely used by electronic devices such as sensors and displays. For example, the acquisition devices that acquire the point clouds may additionally acquire RGB color information. Therefore, conversion of the HSL color element provides a new RGB color element derived from the point cloud information that can be used to replace or revise the acquired RGB information.

In some embodiments, the conversion may be performed according to predetermined mapping rules. Using step S504, the H, S, L values in the HSL color element may each be within [0, 1]. The corresponding R, G, B values in the RGB color element may also be within [0, 1]. For example, the mapping may be performed as follows:

1. If S=0, then determine the color is grey, and accordingly, R=G=B=L;
2. If S≠0, then calculate intermediate parameters p and q, where If $L<0.5$, $q=L*(1+S)$;

If $L>0.5$, $q=L+S-L*S$;

$p=2*L-q$;

3. Calculate intermediate parameters $T_C$, where $C \in \{R, G, B\}$, $T_R=H+\frac{1}{3}$;

$T_G=H$;

$T_B=H+\frac{1}{3}$;

Then,

If $T_C<0$, $T_C=T_C+1$;

If $T_C>1$, $T_C=T_C-1$;

If $0 \leq T_C \leq 1$, $T_C=T_C+1$;

4. Calculate the R, G, B values $Color_C$ based on the intermediate parameters p, q, and $T_C$, where $C \in \{R, G, B\}$, If $T_C<1/6$, $Color_C=p+(q-p)*6*T_C$;

If $1/6 \leq T_C<1/2$, $Color_C=q$;

If $1/2 \leq T_C<2/3$, $Color_C=p+(q-p)*6*(2/3-T_C)$.

In step S508, the RGB color information derived in step S506 may replace the acquired RGB color information for each target point in the point cloud. In some embodiments, the RGB color information derived by step S506 may be used to "color" the point cloud based on the corresponding normals.

The disclosed embodiments of converting color information in an HSL color model to color information in an RGB color model eliminates the need to convert hue from an angular value to a value in the [0, 1] range. That simplifies the computation and improves the efficiency. In addition, because the acquired RGB color information does not well align with other data of the point cloud and thus inaccurate, by replacing the acquired RGB color information with the RGB color information derived from the elevation information of the point cloud itself, the color information therefore better aligns with the point cloud data, thus improving accuracy of the registration between point clouds.

Returning to FIG. 4, in step S412, point cloud registration unit 344 may extract features of the corresponding target points from every two adjacent point clouds. The features may be extracted based on the 3D coordinates, color information, and normals of the respective target point. In some embodiments, before the features are extracted, the point clouds may be optimized in the world coordinate system. Such optimization may include, but not limited to, noise filtering, hole patching in the point clouds, etc. For example, point cloud registration unit 344 may use filters designed to remove/reduce discrete noises and spikes, thus enhancing meaningful features of the point clouds. As another example, point cloud registration unit 344 may detect the external and internal boundaries of the point clouds, and file the holes defined by the internal boundaries. For instance, a hole can be filled with point cloud data around or near the hole. The optimizations may improve the quality of the point clouds data, thus improving the accuracy of point cloud registration.

In some embodiments, point cloud registration unit 344 may sample the target points in the point cloud to obtain a subset of key points. Features may be extracted from only the sampled key points. In some embodiments, the target points may be down-sampled, e.g., using voxel down-sampling, to find the key points. In some embodiments, the key points may be those that contain important spatial, geometric, or color information of the object.

In step S414, point cloud registration unit 344 may register every two adjacent point clouds based on the extracted features to obtain a transform matrix. Registration is the process of finding a spatial transformation (e.g., scaling, rotation and translation) that aligns two point clouds. The transformation can be characterized by a transform matrix. The purpose of the registration is to bring the two adjacent point clouds into a consistent world coordinate system, so that the point clouds can be merged in a same coordinate system for rending the 3D panorama model. In some embodiments, point cloud registration unit 344 may determine the relative pose between the two adjacent point clouds based on the extract features. In some embodiments, the transformation may be rigid that does not change the distance between any two points, e.g., consisting of only translation and/or rotation. In some embodiments, the transformation may be non-rigid such as scaling and shear mapping. The transform matrix yielded by the registration maps the corresponding target points between every two adjacent point clouds.

In some embodiments, registration methods such as Iterative Closest Points (ICP) algorithm may be used for the registration. Because ICP algorithm relies heavily on point cloud's initial pose, the extrinsic parameter matrix can greatly affect the registration. Accordingly, in some embodiments, the extrinsic parameter matrix may be manually adjusted before registration to ensure correct entry of the initial pose.

Consistent with the present disclosure, the registration considers not only the coordinate information of the point clouds, but also the color information that is derived from the point clouds (e.g., using steps S408 and S410). Because the color information is derived from the point clouds, it inherently aligns with the point cloud data. As a result of the redundancy offered by the color information, the registration may be more robust and more accurate.

In step S416, the point clouds are transformed into the world coordinate system using the respective transform matrices obtained through registration. The transformation maps the point clouds into the world coordinate system so that they can be merged into a wide-angle collective point cloud, e.g., a 360-degree point cloud set.

In step S418, panorama rendering unit 346 may render a 3D panorama model based on the collective point cloud in the world coordinate system. In some embodiments, the model can be rendered using surface reconstruction methods that reconstruct a 3D surface of the object to obtain the model. For example, a Poisson surface reconstruction algorithm can be used, which creates a 3D triangular mesh of the object. Other polygon mesh reconstruction methods may also be used.

Another aspect of the disclosure is directed to a non-transitory computer-readable medium storing instruction which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

The invention claimed is:

1. A system for constructing a three-dimensional panorama model of an object, comprising:
   a storage device configured to receive a plurality of point clouds acquired at a plurality of different view angles selected from an angular range in a horizontal plane, wherein each point cloud includes three-dimensional positions of a plurality of target points on a surface of the object; and
   at least one processor configured to:
      determine elevation and normal at each target point in each point cloud;
      convert the elevation of each target point to color information;
      register every two adjacent point clouds acquired at two adjacent view angles among the plurality of view angles based on features extracted from the three-dimensional positions, the normal, and the elevation converted color information of the respective target points of the two adjacent point clouds; and
      render the three-dimensional panorama model based on the registered point clouds.

2. The system of claim 1, wherein the plurality of point clouds are acquired by a plurality of acquisition devices,
   wherein the storage device is further configured to receive extrinsic parameters of each of the plurality of acquisition devices,
   wherein the at least one processor is further configured to calibrate each point cloud based on the extrinsic parameters of the corresponding acquisition device that acquires the point cloud.

3. The system of claim 1, wherein the object is a real estate property and the three-dimensional panorama model is a three-dimensional scene of an interior of the real estate property, wherein the plurality of view angles are selected according to surface variations of the real estate property.

4. The system of claim 1, wherein the plurality of point clouds are determined based on depth images acquired at the respective different view angles.

5. The system of claim 1, wherein to convert the elevation of each target point to the color information, the at least one processor is further configured to:
   map the elevation to a value in a predetermined range;
   determine a first color element in a first color model based on the mapped value; and
   convert the first color element in the first color model to a second color element in a second color model.

6. The system of claim 5, wherein the first color model is an HSL color model, wherein at least one processor is further configured to:
   designate the mapped value as a hue value of the first color element;
   designate a first predetermined value as a saturation value of the first color element; and
   designate a second predetermined value as a lightness value of the first color element.

7. The system of claim 5, wherein the second color model is an RGB color model.

8. The system of claim 5, wherein the at least one processor is further configured to replace acquired color information included in the acquired point clouds with the second color element for each target point.

9. The system of claim 1, wherein to register every two adjacent point clouds, the at least one processor is further configured to:
   extract features of corresponding target points from the two adjacent point clouds; and
   determine a transform matrix that transforms one of the two adjacent point clouds to the other one of the two adjacent point clouds based on the features.

10. The system of claim 9, wherein to render the three-dimensional panorama model based on the registered point clouds, the at least one processor is further configured to:
    transform the plurality of point clouds using the respective transform matrices into a world coordinate system; and
    merge the transformed point clouds into a collective point cloud in the world coordinate system.

11. The system of claim 10, wherein to render the three-dimensional panorama model based on the registered point clouds, the at least one processor is further configured to:
    reconstruct a three-dimensional surface of the object based on the collective point cloud.

12. A computer-implemented method for constructing a three-dimensional panorama model of an object, comprising:
    receiving a plurality of point clouds acquired at a plurality of different view angles selected from an angular range in a horizontal plane, wherein each point cloud includes three-dimensional positions of a plurality of target points on a surface of the object;
    determining, by at least one processor, elevation and normal at each target point in each point cloud;
    converting the elevation of each target point to color information;
    registering, by the at least one processor, every two adjacent point clouds acquired at two adjacent view angles among the plurality of view angles based on features extracted from the three-dimensional positions, the normal, and the elevation converted color information of the respective target points of the two adjacent point clouds; and
    rendering, by the at least one processor, the three-dimensional panorama model based on the registered point clouds.

13. The computer-implemented method of claim 12, wherein the plurality of point clouds are acquired by a plurality of acquisition devices, wherein the computer-implemented method further comprises:
    receiving extrinsic parameters of each of the plurality of acquisition devices; and
    calibrating each point cloud based on the extrinsic parameters of the corresponding acquisition device that acquires the point cloud.

14. The computer-implemented method of claim 12, wherein the object is a real estate property and the three-dimensional panorama model is a three-dimensional scene of an interior of the real estate property, wherein the plurality of view angles are selected according to surface variations of the real estate property.

15. The computer-implemented method of claim 12, wherein converting the elevation of each target point to the color information further comprises:
    mapping the elevation to a value in a predetermined range;
    determining a first color element in a first color model based on the mapped value; and
    converting the first color element in the first color model to a second color element in a second color model.

16. The computer-implemented method of claim 15, wherein the first color model is an HSL color model and the second color model is an RGB color model, wherein determining the first color element further comprises:

designating the mapped value as a hue value;

designating a first predetermined value as a saturation value; and designating a second predetermined value as a lightness value.

17. The computer-implemented method of claim 12, wherein registering every two adjacent point clouds further comprises:

extracting features of corresponding target points from the two adjacent point clouds; and determining a transform matrix that transforms one of the two adjacent point clouds to the other one of the two adjacent point clouds based on the features.

18. The computer-implemented method of claim 9, wherein rendering the three-dimensional panorama model based on the registered point clouds further comprises:

transforming the plurality of point clouds using the respective transform matrices into a world coordinate system;

merging the transformed point clouds into a collective point cloud in the world coordinate system; and reconstructing a three-dimensional surface of the object based on the collective point cloud.

19. A non-transitory computer-readable medium having stored thereon computer instructions, when executed by at least one processor, perform a method for constructing a three-dimensional panorama model of an object, comprising:

receiving a plurality of point clouds acquired at a plurality of different view angles selected from an angular in a horizontal plane, wherein each point cloud includes three-dimensional positions of a plurality of target points on a surface of the object;

determining elevation and normal at each target point in each point cloud;

converting the elevation of each target point to color information;

registering every two adjacent point clouds acquired at two adjacent view angles among the plurality of view angles based on features extracted from the three-dimensional positions, the normal, and the elevation converted color information of the respective target points of the two adjacent point clouds; and rendering the three-dimensional panorama model based on the registered point clouds.

20. The non-transitory computer-readable medium of claim 19, wherein converting the elevation of each target point to the color information further comprises:

mapping elevation to a value in a predetermined range;

determining a first color element in a first color model based on the mapped value; and converting the first color element in the first color model to a second color element in a second color model.

* * * * *